United States Patent [19]
Veilleux, Jr. et al.

[11] Patent Number: 5,551,478
[45] Date of Patent: Sep. 3, 1996

[54] MULTIPLEXING HYDRAULIC CONTROL NETWORK WITH LATCHING VALVES

[75] Inventors: Leo J. Veilleux, Jr., Wethersfield; David T. Anzulewicz, Rocky Hill; Gerald P. Dyer, Enfield, all of Conn.

[73] Assignee: United Technologies Corporation, Hartford, Conn.

[21] Appl. No.: 327,026

[22] Filed: Oct. 21, 1994

[51] Int. Cl.⁶ ................................................. F15B 13/07
[52] U.S. Cl. .................... 137/596.15; 91/524; 91/529; 137/596.16
[58] Field of Search ........................ 91/426, 524, 526, 91/529; 137/596.15, 596.16

[56] References Cited

U.S. PATENT DOCUMENTS

| | | |
|---|---|---|
| 3,814,376 | 6/1974 | Reinicke . |
| 3,896,914 | 7/1975 | Konsbruck et al. . |
| 4,622,998 | 11/1986 | Kussel et al. ................ 137/596.15 |
| 4,627,467 | 12/1986 | Martin . |
| 4,805,515 | 2/1989 | Kast . |
| 4,854,222 | 8/1989 | Vick . |
| 4,913,032 | 4/1990 | Wernberg . |
| 5,048,394 | 9/1991 | McLevige et al. . |
| 5,088,383 | 2/1992 | Wardle et al. . |
| 5,285,715 | 2/1994 | Elrod, Jr. et al. . |

*Primary Examiner*—Gerald A. Michalsky
*Attorney, Agent, or Firm*—Richard H. Kosakowski, Esq.; Holland & Bonzagni, P.C.

[57] ABSTRACT

A hydraulic control system for a jet aircraft engine has an electronic control that commands a pair of torque motors to ultimately control the position of each one of a plurality of two-position, "latching" hydraulic actuator valves. A first torque motor is operable with a three-position, on/off hydraulic valve. The second torque motor operates in conjunction with a second valve to control the linear position of the spool of a multiplexer selector valve. The multiplexer selector valve has a plurality of positions that the spool can be linear translatable to. At each position is located a pair of control ports to which are ultimately connected one side of each of a pair of corresponding hydraulic actuator valves. The actuator valves may comprise fuel or air valves. A selected fuel or air actuator valve is translated between one of its two positions by translating the spool of the multiplexer selector valve to the appropriate position and then porting high pressure hydraulic fluid to that actuator valve for a predetermined period of time. The control system can asynchronously chose any fuel or air actuator valve to translate, as necessary, at any point in time.

21 Claims, 5 Drawing Sheets

180
MULTIPLEXING HYDRAULIC CONTROL NETWORK WITH LATCHING VALVES

BACKGROUND OF THE INVENTION

This invention relates to a hydraulic control system, and more particularly to such a system having a plurality of two-position, "latching" actuator valves, such as fuel and/or air valves, that are positionally controlled by a pair of torque motors and associated hydraulic valves, together with a single hydraulic multiplexing selector valve.

In the art of hydraulic control systems or networks for apparatus such as aircraft, and in particular, an aircraft jet engine, the trend is towards more complex systems. The increased complexity is due to a desire to improve fuel efficiency. However, the increased complexity has provoked corresponding undesirable increases in the weight and cost of these control systems, along with a corresponding decrease in their reliability.

Part of the increased complexity stems from an increase in the number of mechanical variables or functions on a jet aircraft engine that must be controlled, either hydraulically or pneumatically. The mechanical variables, such as the engine bleed, typically are controlled by hydraulic or pneumatic actuators that, in turn, are controlled by fuel or air actuator valves.

In the prior art, it is known to provide a control system having actuators controlled by corresponding electromechanical devices, such as torque motors and associated actuator valves. Each torque motor and actuator valve combination converts an electrical input signal from an electronic control into a corresponding mechanical position. With a hydraulic or pneumatic actuator connected to the actuator valve, the electrical signal is converted into a corresponding actuator position.

The primary problem with having a single torque motor dedicated to only a single hydraulic actuator valve and actuator is that, as the number of hydraulic actuators required on the jet aircraft engine increases, the corresponding number of torque motors and actuator valves also increases. This adds to the cost and weight of the overall control system.

Therefore, there are known attempts in the prior art to dedicate a plurality of hydraulic or pneumatic actuator valves and corresponding actuators to a single torque motor. This form of multiplexing is the subject of numerous and varied schemes in the prior art. A common requirement of any multiplexed system is that sufficient hydraulic fluid flow must be provided to each actuator valve. This requirement has caused some multiplexed systems to be generally unreliable due to the lack of the multiplexer, e.g., a pilot valve or a spool valve, to provide adequate flow rate to the actuator valves. The problem is compounded by the usage of actuator valves whose positions vary across the entire range of motion of the movable element of the valve, such as the spool. This "analog" type of continuously modulating actuator valve requires virtually constant high pressure hydraulic fluid to be applied to both sides of the spool to either translate the spool or hold it in a constant position.

Several multiplexer schemes are known in the prior art. One involves a single pilot valve multiplexed among a plurality of actuator valves and associated actuators. The spool of the pilot valve is rotated for multiplexing among a plurality of output ports arranged at different angular positions of the spool. However, this scheme suffers from reduced flow rate to the actuator valves.

Besides rotary-type multiplexer valves, it is known to provide a multiplexer valve whose spool translates linearly to connect an input to one of a plurality of outputs. An example of such a system is given in U.S. Pat. No. 5,048,394, wherein a single torque motor and valve combination controls a hydraulic valve that acts as a multiplexer. The multiplexer connects a single input among a plurality of outputs. The outputs are continuously-modulating actuator valves of the analog-type described hereinbefore. Thus, these valves must be periodically updated, even to merely hold them in their last position, by applying hydraulic fluid to the valve spool. The '394 patent does this constant updating in a synchronous manner by the addition of an oscillator valve to the overall control system. The oscillator valve drives the spool of the multiplexer hydraulic valve linearly back and forth.

Problems with this type of system include the fact that the constant need to update the position of all of the actuator valves can potentially cause torque motor fatigue failures, thereby reducing the lifespan of the torque motor, or constant movement of the oscillator valve could cause valve wear. Also, in order to keep the actuator valves properly positioned, the timing and response of the multiplexer hydraulic valve are critical and, therefore, must be carefully controlled. In addition, and perhaps most importantly, there is no means provided for controlling the position of the actuator valves and actuators if there is a failure of the control system for the torque motors, the control system being typically electronic in nature. If one or more actuator valves and actuators are dedicated to controlling the engine bleed for an aircraft jet engine, the lack of a "fail-safe" condition for the hydraulic/pneumatic actuator valves could create a potentially hazardous condition.

Other examples of prior art multiplexer control systems are given in U.S. Pats. Nos. 4,913,032 and 5,088,383.

Accordingly, it is a primary object of the present invention to provide a multiplexed hydraulic control system having a plurality of two-position, latching actuator valves, such as fuel/air valves, that are controlled by a pair of torque motors and a single multiplexing selector valve.

It is a general object of the present invention to provide such a multiplexed hydraulic control system that overcomes prior art systems that required a dedicated torque motor for each actuator valve.

It is another object of the present invention to provide such a multiplexed hydraulic control system that reduces overall control system weight and cost while also improving reliability.

It is yet another object of the present invention to provide such a multiplexed hydraulic control system that utilizes two-position, "latching" hydraulic actuator valves that do not have to be continuously updated with hydraulic fluid to maintain their position, thereby allowing for a simpler asynchronous control architecture that prolongs the anticipated life of the system components, including the torque motors, and eliminates critical hydraulic valve timing and response requirements found in prior art systems.

It is yet another object of the present invention to provide a multiplexed hydraulic control system that allows the position of each actuator valve to be controlled to a "fail-safe" position in the event that the electronic control system fails.

It is still another object of the present invention to provide a multiplexed hydraulic control system that allows the actuator valves to be activated or translated in any desired sequence, even one where the actuator valves are only accessed when they require translation.

It is another object of the present invention to provide a multiplexed hydraulic control system that allows the point in time that each actuator valve is serviced to be independent of all other actuator valves.

The above and other objects and advantages of the present invention will become more readily apparent when the following description is read in conjunction with the accompanying drawings.

SUMMARY OF THE INVENTION

To overcome the deficiencies of the prior art and to achieve the objects listed above, the Applicants have invented an improved hydraulic control system that utilizes a single hydraulic multiplexer selector valve to control the position of each of a plurality of two-position hydraulic actuator valves.

In the preferred embodiment, an engine control for a jet aircraft engine is electronic in nature and issues command signals to a pair of torque motors. A first torque motor acts in conjunction with a three-position hydraulic valve. The second torque motor operates in conjunction with a second hydraulic valve to control the linear position of the spool of the multiplexer selector valve. The multiplexer selector valve is a two-by-twelve valve in that the valve spool is linearly translatable between twelve different positions. In each of the twelve positions, it is possible to generate two high pressure signals to a pair of two-position ("ON/OFF") latching hydraulically-controlled fuel and/or air actuator valves. Each actuator valve requires a high pressure signal to turn it "ON", and another high pressure signal to turn it "OFF". Thus, a total of twelve actuator valves are controlled in a preferred embodiment of the present invention. The position of the multiplexer selector valve spool is fed back to the electronic control via a linear variable differential transducer ("LVDT").

In operation, the spool of the multiplexer selector valve is translated by the second torque motor with the first torque motor and associated hydraulic valve in a null position. During selector valve translation, low pressure hydraulic fluid is provided to all twelve fuel/air actuator valves. Once the spool of the multiplexer selector valve reaches the new desired position, the electronic control commands the three-position hydraulic valve to saturate against a first stop, thereby porting high pressure hydraulic fluid to one of the pair of control ports while also porting low pressure hydraulic fluid to the other control port. The fuel/air actuator valve at that control port with the high pressure hydraulic fluid applied thereto is translated between one of its two positions. When the actuator valve translates to the right, high pressure is ported via a land on the actuator valve to one side of the actuator valve piston to hydraulically latch the valve in its position. When the actuator valve translates to the left, the high pressure port that was latching the actuator valve is closed, so a spring maintains the position of the valve. In this manner, the actuator valve will latch in position once the actuator valve is caused to translate by the pressure signal from the three-position hydraulic valve and the high pressure signal is removed.

If it is desired to translate the fuel/air actuator valve at the second control port at that same multiplexer selector valve position, the electronic control commands the three-position hydraulic valve to saturate against a second stop. This ports high pressure fluid to this fuel/air actuator valve, thereby translating it.

DETAILED DESCRIPTION OF THE PREFERRED EMBODIMENTS

Referring to the drawings in detail, a preferred embodiment of a multiplexing hydraulic control network with latching actuator valves is illustrated therein and generally designated by the reference numeral 100. The control network 100 includes an electronic control 104 that sends signals to a pair of torque motors 108, 112 that correspondingly control the flow of hydraulic fluid through a pair of associated hydraulic valves 116, 120. A first hydraulic valve 116 has its two hydraulic outputs 124, 128 connected to the ends of a spool 132 of a multiplexer selector valve 136. The spool 132 is linearly movable between a plurality of discrete positions, each position corresponding to a pair of output ports located among a plurality of output ports 140, 144 on a sleeve 146 of the selector valve 136. The second hydraulic valve 120 is a two-stage, three-position valve that directs hydraulic fluid of one of two predetermined pressures to the multiplexer selector valve 136 and ultimately through one of the output ports 140–144 of the valve 136 to one of a plurality of fuel/air actuator valves 148 connected thereto. Each actuator valve 148 is a two-position, "on/off" valve that either hydraulically or pneumatically controls the position of a corresponding actuator 152 connected to an output of the actuator valve 148.

Figure 1:
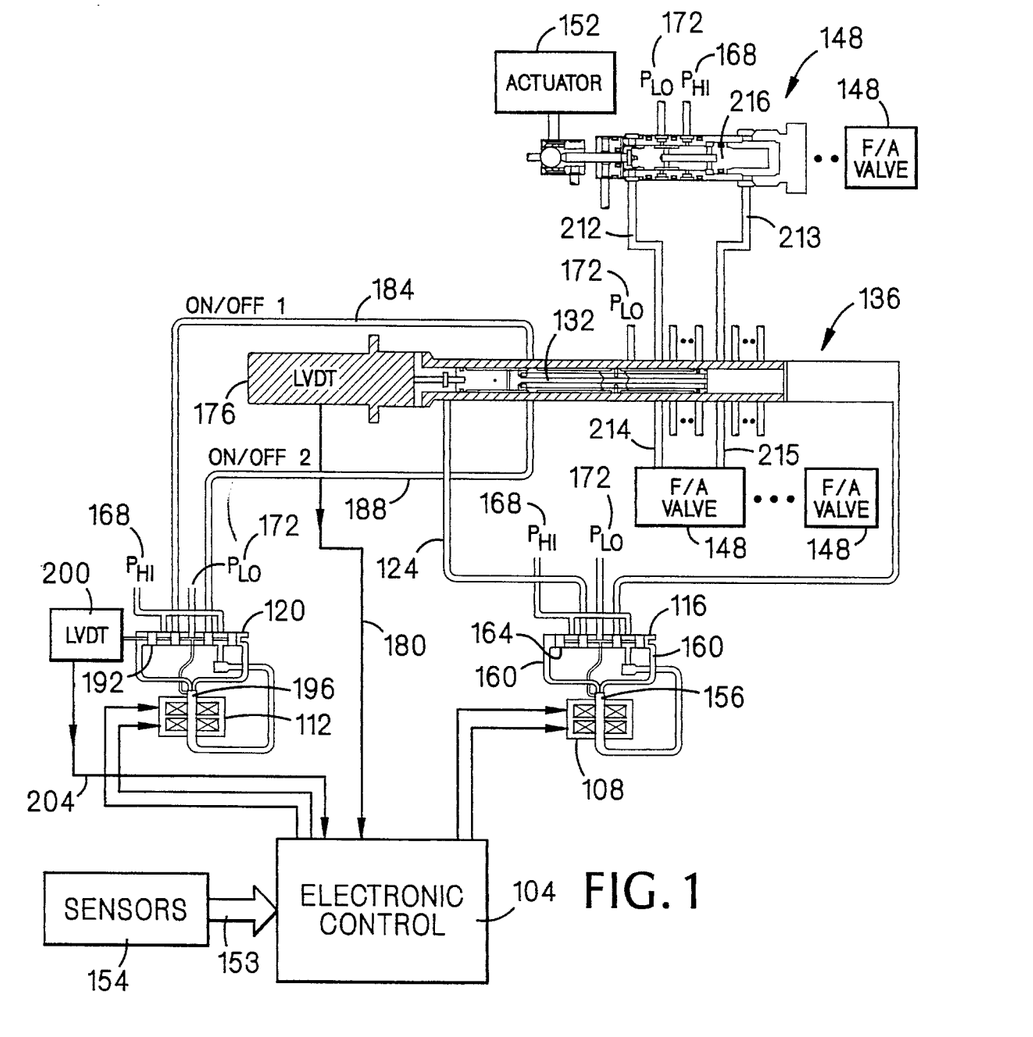
FIG. 1 is a block diagram illustration, partly in schematic and partly cross-sectional, of a multiplexing hydraulic control network of the present invention.

Referring to FIG. 1, the multiplexing hydraulic control network 100 of the present invention may be utilized on an aircraft (not shown), and specifically in conjunction with the control of various mechanical variables associated with a jet aircraft engine (not shown). The control network 100 includes an electronic control device 104 that is responsive to signals on lines 153 from sensors 154 located on the aircraft. The sensors 154 sense various aircraft parameters such as engine speed. The control 104 is responsive in part to these signals 153 to control the ultimate position of all of the actuator valves 148.

The control 104 provides a pair of electrical signals to a first torque motor 108. The torque motor 108 magnetically deflects either a jet pipe valve or a flapper valve 156 to direct hydraulic fluid of a relatively high pressure ($P_{HI}$) traveling through hydraulic lines 160 to both ends of a spool 164 of a first hydraulic valve 116. The spool 164 of this valve 116 is linearly deflected in either of two directions depending upon the pressure differential of the hydraulic fluid applied to the ends of the spool 164. The hydraulic valve 116 passes hydraulic fluid of either a high pressure 168 or a low pressure 172 within a pair of hydraulic lines 124, 128 connected to either end of a spool 132 of a multiplexer selector valve 136. The fluid pressure selected depends upon the position of the valve spool 164, specifically the "lands" on the spool, in routing either high pressure, $P_{HI}$ 168, or low pressure, $P_{LO}$ 172, through the hydraulic lines 124, 128. The spool 132 of the selector valve 136 has its position sensed by a linear variable differential transducer ("LVDT") 176, which passes a signal on a line 180 back to the electronic control 104, the signal being indicative of the linear position of the spool 132 of the multiplexer selector valve 136.

The multiplexer selector valve 136, which is illustrated in greater detail in FIGS. 3–10 and 12, has its spool 132 operable to linearly connect a pair of input ports 184, 188 to a corresponding pair of output ports selected from among a plurality of output ports 140, 144 on the sleeve 146 of the selector valve 136. In a preferred embodiment of the present invention, the sleeve 146 of the multiplexer selector valve 136 has twenty-four output ports arranged in two sets 140, 144, each set having twelve output ports. The selector valve 136 connects a first hydraulic input signal 184 to a selected one of the twelve output ports of the first set 140. The multiplexer selector valve 136 also connects a second hydraulic input signal 188 to a selected one of the twelve output ports of the second set 144.

The pair of multiplexer selector valve hydraulic inputs 184, 188 emanate from a second hydraulic valve 120. This valve 120 has a linearly translatable spool 192 that is positionally controlled between three different positions by hydraulic fluid of either a high or low pressure. The control of the hydraulic fluid is accomplished by the magnetic deflection of either a flapper valve or a jet pipe valve 196 through use of a second torque motor 112. This torque motor 112 is controlled by electrical signals from the electronic control 104. The linear position of the spool 192 of the hydraulic valve 120 is sensed by a second LVDT 200 that presents a signal indicative thereof on a line 204 to the electronic control 104.

Figure 2:
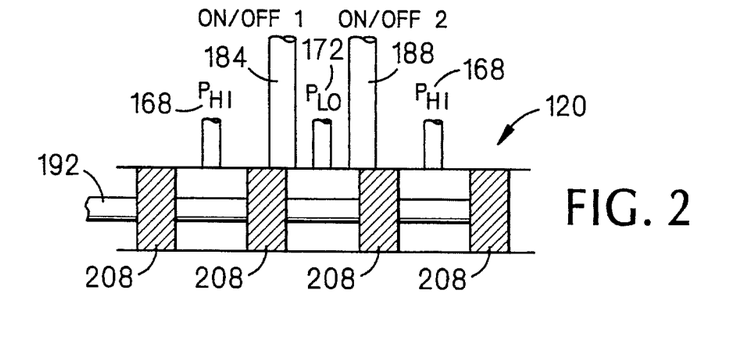
FIG. 2 is a block diagram illustration, partly in cross-section, of a portion of a three-position hydraulic valve that forms part of the control of FIG. 1.

FIG. 2 illustrates the "underlapped" spool 192 of the second hydraulic valve 120 in greater detail. The spool 192 is linearly positionable between three positions. A first position, illustrated in FIG. 2, is where hydraulic fluid of a relatively low pressure, $P_{LO}$ 172, is ported to both of the hydraulic signal lines 184, 188 that are input to the multiplexer selector valve 136 ("ON/OFF 1", "ON/OFF 2"). This position is referred to as the "null" position of the valve spool 192. Alternatively, the hydraulic fluid in the two input signal lines 184, 188 flows back through the spool 192 of the hydraulic valve 120 and to a low pressure hydraulic sink ($P_{LO}$) 172.

A second position of the spool 192 of the hydraulic valve 120 is where the electronic control 104 ultimately commands the spool 192 all the way to the right to saturate against a right-hand stop position. In this instance, the four lands 208 of the spool 192 are positioned such that hydraulic fluid of a relatively higher pressure ($P_{HI}$) 168 is ported to the first multiplexer selector valve input ("ON/OFF 1") 184, while at the same time a relatively lower hydraulic pressure fluid ($P_{LO}$) 172 is ported to the second multiplexer selector valve input ("ON/OFF 2") 188. As described in more detail hereinafter with respect to an alternative embodiment of FIGS. 13–15, this right-most position of the spool 192 is the "fail-safe" position; i.e., the position that the valve is mechanically biased to in the event of a failure of the electronic control 104 (see FIG. 15).

A third position of the hydraulic valve spool 192 is where the spool 192 is movable to saturate against a left-hand stop. In such a position, low pressure hydraulic fluid 172 is ported to the first multiplexer selector valve input line 184, while high pressure hydraulic fluid 168 is ported to the second multiplexer selector valve input line 188.

Figure 11:
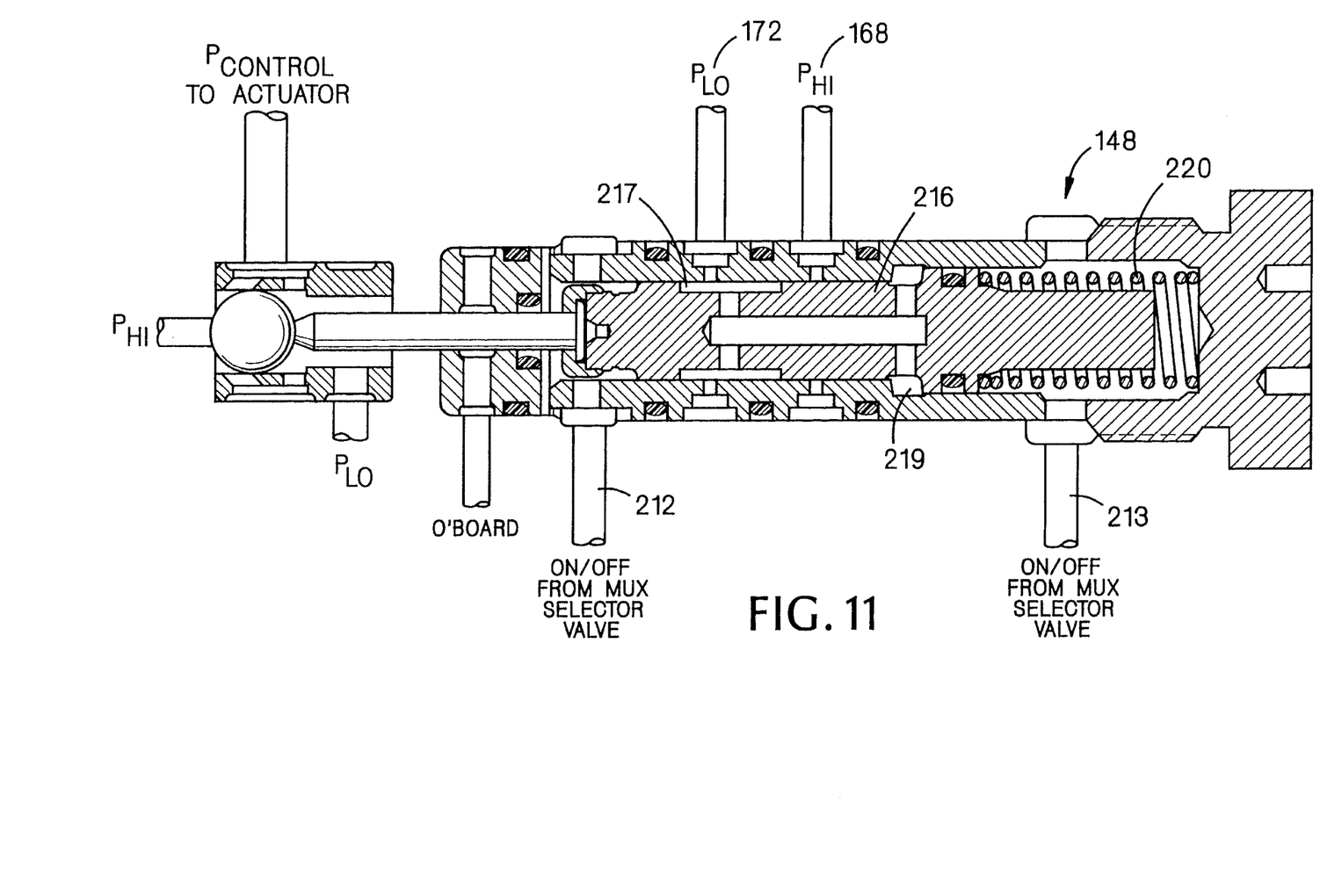
FIG. 11 is a block diagram illustration, partly in cross-section, of a fuel/air actuator valve that forms part of the control of FIG. 1.

The hydraulic fluid pressure at the first multiplexer selector valve input line 184 is channeled through the internal valve structure ultimately to the selected one of the twelve valve outputs in the first set 140 of outputs. All of the non-selected outputs within each set 140, 144 of twelve outputs has low pressure hydraulic fluid 172 ported therethrough. Twelve fuel/air actuator valves 148 are connected to the twenty-four output ports 140, 144 of the multiplexer selector valve 136 by appropriate hydraulic lines 212–215. Each actuator valve 148 has a pair of hydraulic lines 212–215 associated therewith, the pair of hydraulic lines being within the same set 140, 144 of twelve selector valve outputs. Each fuel/air actuator valve 148, which is illustrated in FIG. 11 in greater detail, has a spool 216 that is linearly positionable between two extreme positions. The spool 216 of each actuator valve 148 is positioned or translated using high pressure hydraulic fluid 168 routed from the appropriate output ports 140, 144 of the multiplexer selector valve 136. Each fuel/air actuator valve 148 controls an associated hydraulic or pneumatic actuator 152 that, in turn, controls a mechanical variable on the aircraft, such as engine bleed.

The operation of the entire multiplexing hydraulic control network 100 of the present invention is best understood by example. When it is desired to change the mechanical variable controlled by a certain actuator 152, the electronic control 104 commands the first torque motor 108 to direct hydraulic fluid of appropriate pressures on the hydraulic lines 124, 128 to the ends of the spool 132 of the multiplexer selector valve 136. This linearly translates the spool 132 to connect one of the two hydraulic inputs 184, 188 to one of the twelve outputs within one of the two sets 140, 144 of output ports. The electronic control 104 also commands the second torque motor 112 to linearly translate the spool 192 of the second hydraulic valve 120 off of its null position to port high pressure hydraulic fluid 168 to the selected one of the two input ports 184, 188 of the multiplexer selector valve 136. This high pressure hydraulic fluid 168 is then routed through the selector valve 136 to a selected one of the output ports 140, 144 on the sleeve 146 of the valve and through one of the connected hydraulic lines 212–215 to one side of the spool 216 of the selected fuel/air actuator valve 148. For example, when it is desired to translate the spool 216 of the actuator valve 148 illustrated in detail in FIG. 1 to the right, high pressure hydraulic fluid 168 is fed on the line 212. This high pressure hydraulic fluid 168 causes the spool 216 of the selected fuel/air actuator valve 148 to translate to the right, thereby changing the position of the actuator 152 connected to the output of the spool 216 of the fuel/air actuator valve 148.

When the selected actuator valve 148 translates to the right, high pressure fluid 168 is ported via a land 217 (FIG. 11) on the actuator valve to one side of the actuator valve piston 219 to hydraulically latch the valve in its position. When the actuator valve 148 translates to the left (as illustrated in FIG. 11), the high pressure port 168 that was latching the actuator valve 148 is closed, so a spring 220 maintains the position of the valve. In this manner, the actuator valve 148 will latch in position once the actuator valve 148 is caused to translate by the high pressure hydraulic signal on the line 213 from the three-position hydraulic valve 120 once the high pressure signal 168 is removed.

If it is desired to translate the spool 216 of the same fuel/air actuator valve 148 to the second position (i.e., to the left), the electronic control 104 must command the first torque motor 108 and associated hydraulic valve 116 to linearly translate the spool 132 of the multiplexer selector valve 136 to the second output port 140, 144 associated with that particular fuel/air actuator valve 148. Then, high pressure hydraulic fluid 168 is selected by the second torque motor 112 and hydraulic valve 120 to pass through the selector valve 136 through this output port 140, 144 on the line 213 to the other side of the spool 216 of the fuel/air actuator valve 148. It should be understood that to translate the spool 216 of any fuel/air actuator valve 148, high pressure hydraulic fluid 168 is ported to one side of the spool 216, while low pressure hydraulic fluid 172 is ported to the other side of the spool 216. When the spool 216 of the selected fuel/air actuator valve 148 has completed its movement, the electronic control 104 then commands the second torque motor 112 and hydraulic valve 120 to assume the null position, thereby porting low pressure hydraulic fluid 172 to both input ports 184, 188 of the multiplexer selector valve 136 and thus to both sides of the spool 216 of each fuel/air actuator valve 148.

On the other hand, if it is desired to translate one of the six fuel/air actuator valves 148 connected among the second set 144 of twelve output ports of the multiplexer selector valve 136 (that is, those illustrated below the selector valve 136 in FIG. 1), the electronic control 104 commands the first torque motor 108 and hydraulic valve 116 to translate the spool 132 of the multiplexer selector valve 136 accordingly to the proper output port 144. Then, the electronic control 104 commands the second torque motor 112 and hydraulic valve 120 to apply high pressure hydraulic fluid 168 to the second input port 188 of the multiplexer selector valve 136. At the same time, low pressure hydraulic fluid 172 is ported to the first input 184 of the multiplexer selector valve 136. The high pressure hydraulic fluid 168 is fed on a line 214 to the left side of the spool of the actuator valve 148 illustrated in FIG. 1 just below the selector valve 136. Then, once the spool 216 of the selected fuel/air actuator valve 148 has been translated to the right, the electronic control 104 returns the second hydraulic valve 120 to its null position.

Finally, to translate the spool of the same actuator valve 148 to the left, the electronic control 104 commands the first torque motor 108 and associated hydraulic valve 116 to linearly translate the spool 132 of the multiplexer selector valve 136 to the second output port 140, 144 associated with that particular fuel/air actuator valve 148. Then, high pressure hydraulic fluid 168 is selected by the second torque motor 112 and hydraulic valve 120 to pass through the selector valve 136 through this output port 140, 144 on the line 215 to the right side of the spool of the selected fuel/air actuator valve 148.

It should be understood that servicing of the actuator valves 148 by the network 100 of the present invention is performed in an asynchronous manner. Also, the actuator valves 148, because they are two-position latching valves, do not need to be periodically updated to maintain their position.

Figure 3:
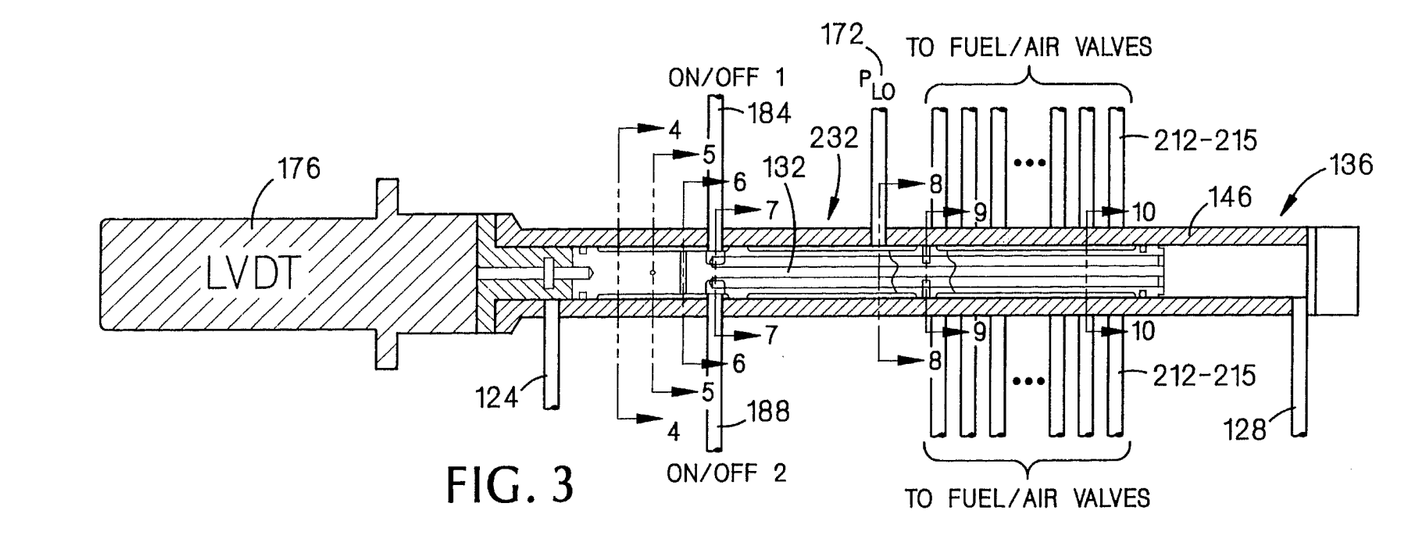
FIG. 3 is a block diagram illustration, partly in cross-section, of a multiplexer selector valve that forms part of the control of FIG. 1.
Figure 12:
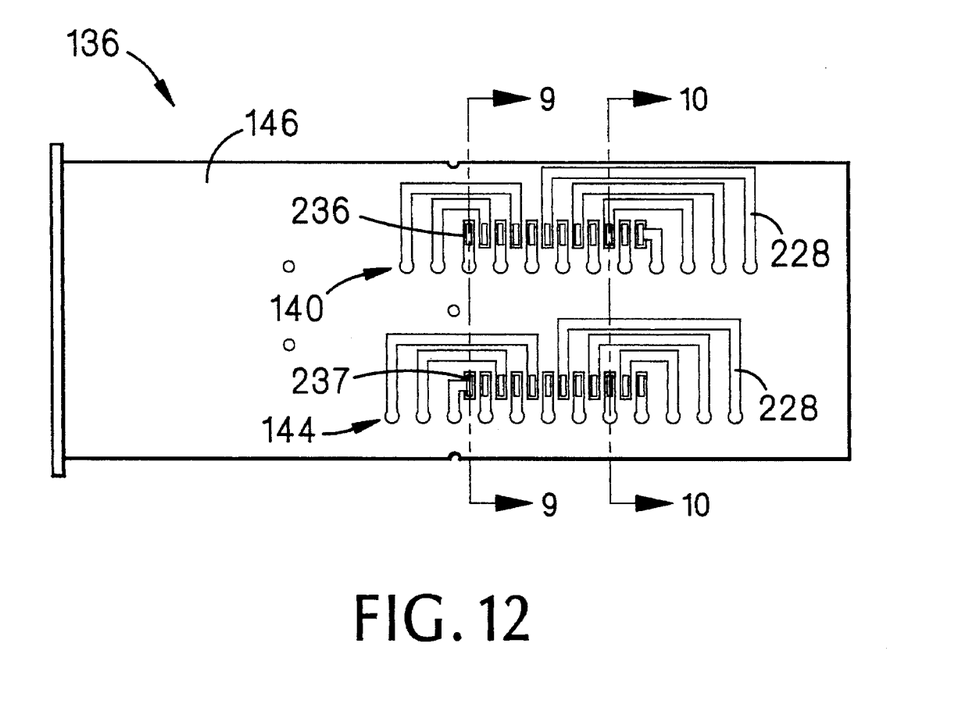
FIG. 12 illustrates an unwrapped perspective view of an outer sleeve of the multiplexer selector valve of FIG. 3.

Referring now to FIGS. 3–10, FIG. 3 illustrates in greater detail the multiplexer selector valve 136, while FIGS. 4–10 illustrate various cross-sectional views taken along the appropriate lines of FIG. 3 and also FIG. 12. FIG. 12 illustrates an "unwrapped" perspective view of the outer sleeve 146 of multiplexer selector valve 136 along with underlying hydraulic lines 228 within the valve sleeve 146 that connect each of the output ports 140, 144 on the sleeve 146 with corresponding outputs 236, 237 of the selector valve piston 219. The valve sleeve 146 is located within the valve body 232.

Figure 7:
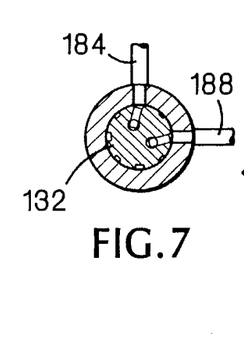

FIG. 3 illustrates in greater detail the linearly translatable spool 132 of the valve 136 that operates to connect the two input hydraulic lines 184, 188 among the selected ones of the twenty-four output ports 140, 144 on the sleeve 146 of the valve 136. These two input lines 184, 188 are drawn 180° apart for clarity in FIG. 3. However, in reality they are 90° apart, as illustrated in FIG. 7. The twenty-four output ports on the sleeve 146 are arranged in two sets 140, 144 of twelve ports each. The sleeve 146 of the selector valve 136 is cylindrical in shape, and each set 140, 144 of twelve output ports is arranged in a linear fashion, with the two sets 140, 144 being disposed 180° opposite one another on the outer circumference of the selector valve sleeve 146. FIG. 3 also illustrates the LVDT feedback device 176 that provides an electrical signal back to the electronic control 104, the signal being indicative of the linear position of the spool 132. The signal aids the electronic control 104 in properly positioning the spool 132 of the selector valve 136.

Figure 4:
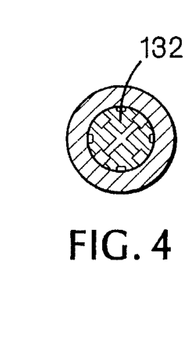
FIGS. 4–10 are various cross-sectional views of the multiplexer selector valve of FIG. 3 taken along the appropriate cross-sectional lines of FIGS. 3 and 12.
Figure 5:
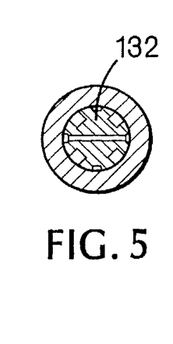
Figure 6:
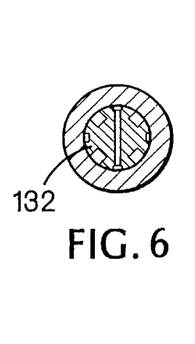

FIGS. 4, 5 and 6 are cross-sectional views, taken along the lines 4—4, 5—5 and 6—6, respectively, of FIG. 3, and illustrate hydraulic balancing cross drilling within the internal structure of the spool 132 of the multiplexer selector valve 136. This arrangement establishes pressure equalization of one side of the valve with the opposite side of the valve, thereby eliminating the potential for large side hydraulic loads.

FIG. 7 is a cross-sectional view, taken along the lines 7—7 of FIG. 3, that illustrates the two input signals ("ON/OFF 1", "ON/OFF 2") 184, 188 arranged at 90° with respect to each other and entering the inside structure of the spool 132 of the multiplexer selector valve 136.

Figures 8, 9:
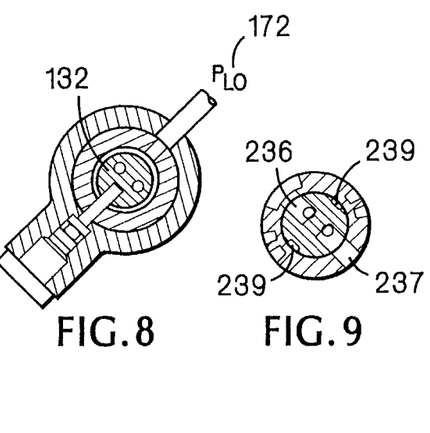

FIG. 8 is a cross-sectional illustration, taken along the lines 8—8 of FIG. 3, that illustrates an anti-rotation feature of the spool 132 of the selector valve 136, with this feature providing angular timing of the windows of the spool 132 with the outer sleeve 146 of the valve 136. FIG. 8 also illustrates a low pressure hydraulic fluid return sink ("$P_{LO}$") 172. The sink prevents short circuiting of high pressure hydraulic fluid 168 on any hydraulic path within the selector valve 136 to any other hydraulic path.

FIG. 9 is a cross-sectional view, taken along the lines 9—9 of both FIGS. 3 and 12, that illustrates one of the two hydraulic input signals 184, 188 to the multiplexer selector valve exiting the piston portion of the spool 132 of the selector valve 136 via one of two piston outputs 236, 237.

Figure 10:
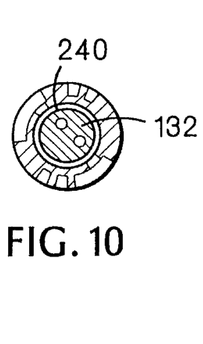

FIG. 10 is a cross-sectional view, taken along the lines 10—10 of FIGS. 3 and 12, and illustrating a low hydraulic pressure return annulus 240. Low pressure hydraulic fluid flow 172 from the fuel/air actuator valves 148 is channeled into this annulus 240. This low pressure hydraulic fluid 172 is connected to the low hydraulic fluid pressure illustrated in FIG. 8 via the cross slots 239 of FIG. 9.

FIG. 12 illustrates the two linear sets 140, 144 of the output ports of the multiplexer selector valve 136. It also illustrates the underlying hydraulic paths 228 that connect the output ports 140, 144 to the piston outputs 236, 237.

FIG. 11 illustrates in more detail an exemplary fuel/air actuator valve 148 used in conjunction with the hydraulic control network 100 of the present invention. It is to be understood that this fuel/air actuator valve 148 is purely exemplary; any other type of two-position, latching fuel or air actuator valves 148 may be utilized with the present invention. The actuator valve 148 controls the application of either high or low hydraulic or pneumatic fluid pressure to a corresponding actuator 152. Such control is accomplished by the linear movement of a spool 216 internal to the body of the fuel/air actuator valve 148. As described hereinbefore, this spool 216 is linearly translatable between either of two end positions, depending upon the hydraulic pressure of a fluid applied to the spool ends from the multiplexer selector valve 136. The actuator valve 148 may also include a spring 220 internal to the actuator valve to help bias or preload the spool 216 to a selected one of its two positions and hydraulic pressure to latch the valve 148 in the other position.

Figure 13:
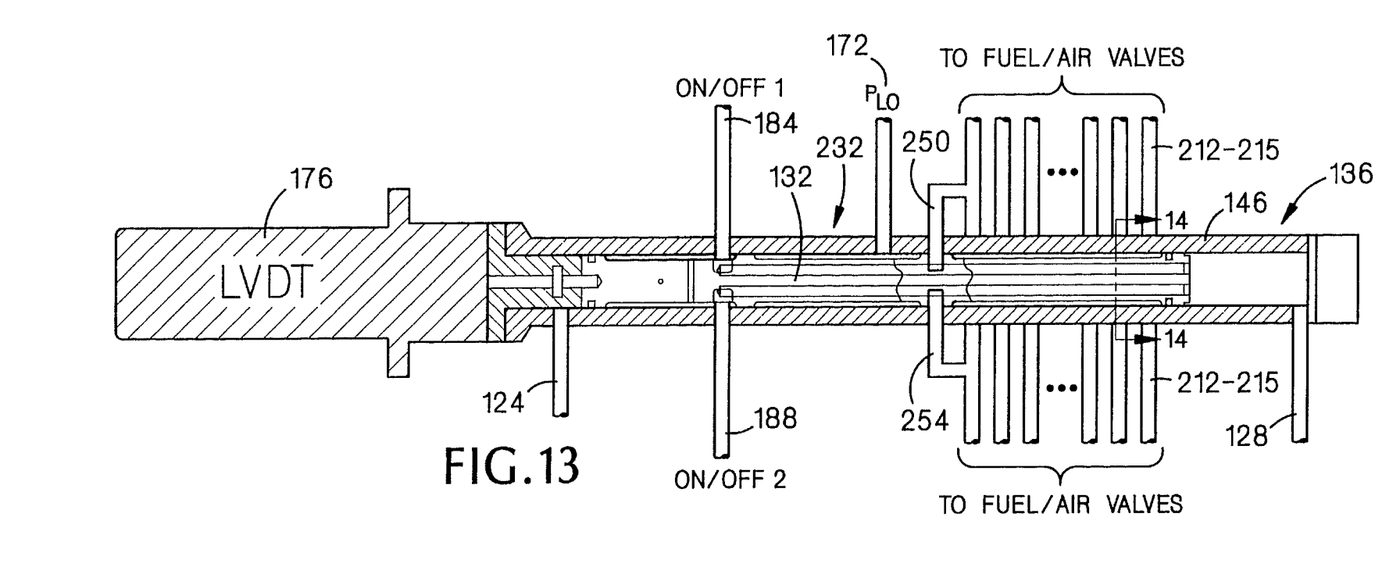
FIG. 13 is a block diagram illustration, partly in cross-section, of an alternative embodiment of the multiplexer selector valve of FIG. 3.
Figure 14:
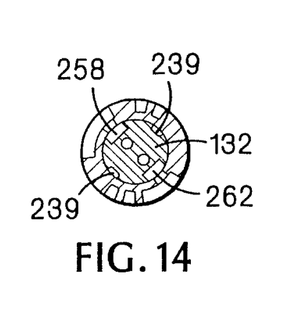
FIG. 14 is a cross-sectional illustration of the multiplexer selector valve of FIG. 13 taken along the lines 14—14 of FIG. 13.

In an alternative embodiment of the portions of the control system 100 of the present invention, a fail-safe feature is provided. FIG. 13 illustrates an alternative embodiment of the multiplexer selector valve 136 that is similar to that of FIG. 3. However the valve 136 of FIG. 13 has two additional hydraulic lines 250, 254 that connect with the left-most hydraulic line 212–215 in each set of lines emanating from the sleeve 146 of the valve 136. Each hydraulic line 250, 254 connects also internal to the valve body 232 with a corresponding input line 184 188 Further, FIG. 14 illustrates the internal structure of the valve spool 132. As compared to FIG. 10, the annulus 240 is removed and replaced with slots 258, 262 that span the length of the valve spool 132 where the lines 212–215 emanate from. As a result, the hydraulic line 250 is connected with selected ones of the lines 212–215 above the valve 136, while the hydraulic line 254 is connected with selected ones of the lines 212–215 below the valve 136.

Figure 15:
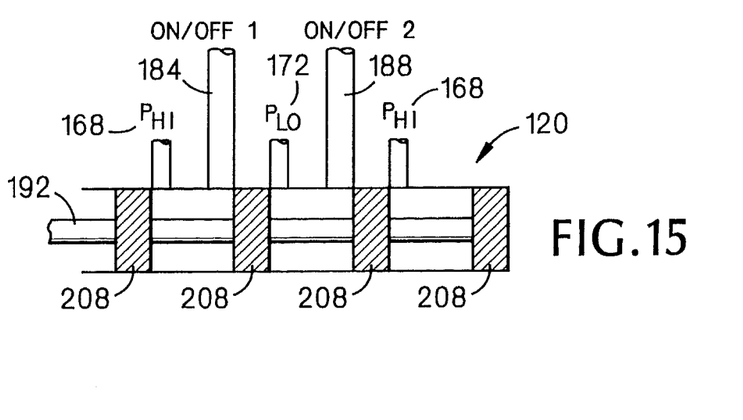
FIG. 15 is a block diagram illustration, partly in cross-section, of the portion of the three-position hydraulic valve of FIG. 2 in a fail-safe position.

In operation, when a failure of the electronic control 104 occurs, the first hydraulic valve 116 has a well-known mechanical bias, such as a spring, that causes hydraulic fluid flow in the lines 160 to bias the spool 164 of the valve 116 all of the way to the left. This provides high pressure hydraulic fluid 168 on the line 128 and low pressure hydraulic fluid 172 on the line 124, forcing the spool 132 of the multiplexer valve 136 all the way to the left. This is the fail-safe position of the valve 136. Also, the second hydraulic valve 120 has a similar mechanical bias that forces the spool 192 of this valve 120 all the way to the right, as illustrated in FIG. 15. This provides high pressure hydraulic fluid 168 on the line 184 and low pressure hydraulic fluid 172 on the line 188. The result is that one side of the spool 216 of every actuator valve 148 has high pressure fluid 168 applied thereto while the other side of every spool 216 has low pressure fluid 172 applied thereto. This translates each actuator valve 148 to a "fail-safe" position.

Another feature of the invention is that the electronic control 104 is responsive to the signals 153 from the sensors 154, as well as the signals 180, 204 from the LVDTs 176, 200, in commanding the spool 132 of the multiplexer selector valve 136 to move either in an asynchronous or synchronous manner. In this way, the spool 132 can "slew" in a non-stop manner to service selected two or more positions synchronously. Or, the spool 132 can stop at selected positions during asynchronous operation.

The present invention has been described for use in a "2×12" arrangement of actuator valves 148. However, the present invention is not limited as such. It may contemplate a single row of one or more actuator valves 148. Alternatively, the invention in its broadest scope may contemplate greater than two rows of valves 148. The resulting structure of the selector valve 136 and hydraulic valves 116, 120 should be apparent to one of ordinary skill in the art in light of the teachings herein. For example, a "4×8" arrangement services a total of 16 actuator valves 148 arranged in four rows of four valves each row. The selector valve 136 would be structured so that each row of outputs 140, 144 was spared 90° apart on the valve sleeve 146. Also four inputs 184, 188 to the valve would be required, which necessitates the use of two three-position hydraulic valves 120.

It should be understood by those skilled in the art that obvious structural modifications can be made without departing from the spirit of the invention. Accordingly, reference should be made primarily to the accompanying claims, rather than the foregoing specification, to determine the scope of the invention.

Having thus described the invention, what is claimed is:

1. A fluid control system, comprising:
   a. a first fluid at a first predetermined pressure;
   b. a second fluid at a second predetermined pressure;
   c. a multiplexer selector valve having an input port selectably connectable with the first fluid and being translatable between a plurality of discrete physical positions, each position corresponding to a selected one of a plurality of selector valve output ports, the selector valve being operable to connect the first fluid selectably connected at the selector valve input port to the selected one of the plurality of selector valve output ports;
   d. means for translating the selector valve between the plurality of selector valve output ports;
   e. a plurality of actuator valves, each one of the actuator valves being connectable with a corresponding at least one of the plurality of selector valve output ports, each one of the actuator valves being translatable between two positions by application of the first fluid thereto, wherein the means for translating is operable to translate the selector valve to a fail-safe position, the selector valve being operable to direct the first fluid to each of the plurality of actuator valves when the selector valve is in the fail-safe position; and
   f. means for selecting the first fluid to be applied to a selected at least one of the actuator valves for a predetermined time to cause translation of the selected at least one of the actuator valves.

2. The control system of claim 1, wherein the means for translating the selector valve comprises a torque motor and a hydraulic valve.

3. The control system of claim 1, wherein the means for selecting comprises a torque motor and a hydraulic valve.

4. The control system of claim 1, wherein the first fluid is hydraulic fluid and the second fluid is hydraulic fluid, wherein the first predetermined pressure of the first hydraulic fluid is of a greater pressure than the second predetermined pressure of the second hydraulic fluid.

5. The control system of claim 1, wherein the multiplexer selector valve contains a movable element that is linearly translatable between the plurality of selector valve output ports.

6. The control system of claim 5, wherein the movable element is a spool.

7. The control system of claim 1, wherein at least one of the selector valve output ports is disposed at each of a selected number of the plurality of discrete physical positions of the multiplexer selector valve.

8. A hydraulic control system, comprising:
   a. a first hydraulic fluid at a first pressure;
   b. a second hydraulic fluid at a second pressure;
   c. a multiplexer selector valve having an input that is connectable with at least one of the first and second hydraulic fluids and having a movable element that is translatable between a plurality of selector valve output ports to connect at least one of the first and second hydraulic fluids to a selected one of the plurality of selector valve output ports;
   d. a plurality of actuator valves, each one of the actuator valves being selectively connectable with a corresponding one of the plurality of valve output ports, each one of the actuator valves being translatable between two positions by selected application of the first hydraulic fluid thereto; and
   e. means for holding each one of the actuator valves in its last one of the two positions upon selected application of the second hydraulic fluid to the actuator valves.

9. The control system of claim 8, wherein the first hydraulic fluid is at a higher pressure than the second hydraulic fluid.

10. The control system of claim 8, wherein the pressure of the first hydraulic fluid is sufficient to translate the actuator valve connected with the selected one of the plurality of selector valve output ports.

11. The control system of claim 8, wherein the movable element of the multiplexer selector valve is linearly translatable between the plurality of selector valve output ports.

12. The control system of claim 11, wherein at least two selector valve output ports are disposed at each discrete physical position of the movable element of the multiplexer selector valve.

13. The control system of claim 8, further comprising means for selecting the first hydraulic fluid to be applied to a selected at least one of the actuator valves for a predetermined time to cause translation thereof.

14. The control system of claim 13, wherein the means for selecting comprises a torque motor and a hydraulic valve.

15. The control of claim 8, further comprising means for translating the movable element between the plurality of selector valve output ports.

16. The control system of claim 15, wherein the means for translating comprises a torque motor and a hydraulic valve.

17. The control system of claim 8, wherein the means for holding comprises a third hydraulic fluid at a predetermined pressure.

18. The control system of claim 8, wherein the means for holding comprises a mechanical force means for applying a force at a predetermined value.

19. A hydraulic control system for a jet aircraft engine that has a plurality of variable parameters that vary with the control of passage of hydraulic fluid through corresponding hydraulic actuators, the hydraulic control system comprising:
   a. a first hydraulic fluid at a first pressure;
   b. a second hydraulic fluid at a second pressure;
   c. a multiplexer selector valve having an input that is connectable with at least one of the first and second hydraulic fluids and having a movable spool that is linearly translatable between a plurality of selector output ports to connect at least one of the first and second hydraulic fluids to a selected one of the plurality of selector valve output ports;
   d. means for translating the spool of the multiplexer selector valve to select one of a plurality of discrete physical locations of the spool, one at least of the discrete physical spool locations corresponding to at least two of the selector valve output ports;
   e. a plurality of actuator valves, each one of the actuator valves being connectable with a corresponding one of the plurality of valve output ports, each actuator valve having a movable element that is translatable between two positions to control the passage of a control fluid therethrough, the control fluid passing through the actuator valve being associated with one of the plurality of variable parameters of the jet aircraft engine;
   f. means for selecting the first hydraulic fluid to be applied to a selected at least one of the actuator valves for a predetermined time to thereby cause translation thereof;
   g. means for selecting the second hydraulic fluid to be applied to at least one of the actuator valves to thereby cause non-translation thereof;
   h. means for holding at least one of the actuator valves in a stationary position when the second hydraulic fluid is applied to the corresponding at least one of the actuator valves by the means for selecting the second hydraulic fluid.

20. The control system of claim 19, wherein the means for holding comprises a third hydraulic fluid at a predetermined pressure.

21. The control system of claim 19, wherein the means for holding comprises a mechanical force means for applying a force at predetermined value.

* * * * *